(12) United States Patent
Blomberg et al.

(10) Patent No.: US 6,177,673 B1
(45) Date of Patent: Jan. 23, 2001

(54) OPTICALLY BLACK SURFACE FOR PRODUCING THE SAME

(75) Inventors: Martti Juhani Blomberg, Vantaa; Altti Kaleva Torkkeli, Espoo; Ari Lehto, Helsinki, all of (FI)

(73) Assignees: Valtion teknillinen Tutkimuskeskus, Espoo; Vaisala Oyj, Helsinki, both of (FI)

(*) Notice: Under 35 U.S.C. 154(b), the term of this patent shall be extended for 0 days.

(21) Appl. No.: 09/208,592

(22) Filed: Dec. 10, 1998

(30) Foreign Application Priority Data

Dec. 10, 1997 (FI) .................................... 974486

(51) Int. Cl.$^7$ ............................................. G01J 5/02
(52) U.S. Cl. .................. 250/339.01; 250/370.08; 250/338.4
(58) Field of Search ............. 250/339.01, 370.08, 250/338.1, 330, 338.4; 257/458, 466, 435; 359/359, 360, 589

(56) References Cited

U.S. PATENT DOCUMENTS

| | | | |
|---|---|---|---|
| 4,568,960 | * 2/1986 | Petroff et al. | ......................... 359/359 |
| 5,369,280 | 11/1994 | Liddiard . | |
| 5,444,577 | 8/1995 | Hobrock . | |
| 5,463,494 | * 10/1995 | Hobrock | ................. 257/458 |
| 5,640,013 | 6/1997 | Ishikawa et al. . | |

OTHER PUBLICATIONS

K.C. Liddiard, "Application of Interferometric Enhancement to Self–Absorbing Thin Film Thermal IR Detectors", Infrared Physics, vol. 34, No. 4, Mar. 5, 1993, pp. 379–387.

L. Dobrzanski, E. Nossarzewska–Orlowska, Z. Nowak, J. Piotrowski, "Micromachined Silicon Bolometers as Detectors of Soft X–Ray, Ultraviolet, Visible and Infrared Radiation", Sensors and Actuators A, vol. 60A, No. 1–03, May 1997, pp. 154–159.

L. Dobrzanski, E. Nossarzewska–Orlowska, Z. Nowak, and J. Piotrowski, "Micromachined Silicon Bolometers as Detectors of Soft X, UV, V and Infrared Radiation", Actuators A 60, Sep. 1996, pp. 1433–1436.

Roy F. Potter, "Basic Parameters for Measuring Optical Properties", Handbook of Optical Constants of Solids, 1985, Chapter 2, pp. 11–33.

\* cited by examiner

Primary Examiner—Seungsook Ham
Assistant Examiner—Richard Hanig
(74) Attorney, Agent, or Firm—Birch, Stewart, Kolasch & Birch, LLP

(57) ABSTRACT

The invention relates to a structure suitable for manufacturing by the fabrication techniques of micro-electronics so as to include an optically black surface that functions as an absorber or emitter, respectively, over a predetermined wavelength range, the structure includes a electrically nonconducting support layer (1), a metallic mirror layer (2) made on the support layer (1), and a lossy layer (4) made on the support layer (1) and the metallic mirror layer (2) superimposed thereon. According to the invention, the mirror layer (2) is made on the upper surface of the support layer (1) and the lossy layer (4) is made from a doped semiconductor material. The thickness of the multilayer structure (3, 4, 7) and the doping of the lossy layer (4) are predetermined relative to each other so that the mirror layer (2) will be optically matched over the predetermined wavelength range of absorption or emission, respectively, to the medium surrounding the structure. The invention also concerns a method for manufacturing the surfaces.

6 Claims, 4 Drawing Sheets

OPTICALLY BLACK SURFACE FOR PRODUCING THE SAME

BACKGROUND OF THE INVENTION

Field of the Invention

The invention is related to a structure for manufacturing and using a fabrication technique of micro-electronics so as to include an optically black surface adapted to function as an absorber or emitter over a predetermined wavelength range.

An optically black surface can be used as an absorber of a limited wavelength range in detectors of optical radiation and an emitting surface in thermal emitters of the optical wavelength range. Particularly in infrared detectors of the bolometer and thermopile type, there is a need for a surface capable of efficiently absorbing radiation over a wide optical wavelength spectrum. Correspondingly, infrared radiation emitters require a surface with a high emissivity. The principle of reciprocity says that a good absorber also is a good emitter, thus making the same surface suitable for use in both applications.

In the context of the present invention, a black surface functioning over a predetermined wavelength range must be understood to refer to a surface of high absorptance over said wavelength range. Respectively, a white surface functioning over a predetermined wavelength range must be understood to refer to a surface of high reflectance over said wavelength range. When such an optically black surface is desired to be used in a detector functioning over said wavelength range, the ideal surface of the detector behaves as a black surface over said wavelength range and as a white or transparent surface outside said wavelength range. Thus, wavelengths falling outside said wavelength range cannot disturb the measurement to be performed.

In conventional techniques, the manufacture of broadband absorbers has been carried out using polymers. This kind of absorber has a thin polymer film deposited on, e.g., a bismuth layer. Additionally, the base polymer could have been blended with absorption-improving agents such as carbon black particles. While polymer-based absorbers have been easy and economical to manufacture, they have also been hampered by a number of drawbacks. The polymers used as the absorber layers have been sensitive to their operating environment, particularly to moisture, and the performance of polymer absorbers have remained far from perfect. Furthermore, the thermal mass of detectors has been relatively large, thus making detectors of the polymer-based absorber type relatively slow by their response speed. An additional disadvantage of polymer films has been their poor high-temperature performance, which excludes their use as an emitting surface in heatable IR emitters.

Also absorber and emitter components are known based on semiconductor technology. In a paper written by K. C. Liddiard in the publication Infrared Physics, 1993, Vol. 34, 4, p. 379 ff., is described a multilayer film structure in which the uppermost layer is a semitransparent metallic thin film is provided with, thereunder a lossless dielectric layer and a lowermost metallic thin film acting as an infrared mirror. The multilayer structure is grown on an unthinned glass substrate. The basic disadvantage of this structure is its slow response and low sensitivity, both resulting from its relatively large thermal mass. The structure is further characterized by a substantially high loss of heat by conduction into the substrate. The semitransparent metallic thin film is difficult to produce to a correct thickness, and moreover, is readily destroyed when serving as the outer surface of the detector.

In a paper published by L. Dobrzanski et al. in the publication Proc. Euro-sensors X, 1996, Löwen, p. 1433 ff., is described a structure further developed from the above-described type by having the absorber deposited on a 100–200 $\mu$m thick silicon wafer. In the structure, there is first deposited on a silicon wafer a 0.2–1.5 $\mu$m thick, lossless film of silicon nitride, and next thereon, a 0.1–1.5 $\mu$m thick, lossy film of doped polycrystalline silicon. The reason for selecting polycrystalline silicon as the top layer material is because of its good performance at elevated temperatures and relatively high temperature coefficient of resistivity. Under the silicon and silicon nitride layers is produced an infrared-reflective mirror by sputtering a layer of tungsten or a nickel-chromium alloy from below via openings made into the substrate.

The above-described structure has a number of disadvantages. The bottomside metallization layer of the component permits high lateral conductivity of heat into the substrate. Since the metallization layer has no protective film thereon, the structure is also unsuitable for use in thermal emitters. Moreover, simultaneous thermal and optical optimization of layer thicknesses in the structure is impossible.

SUMMARY AND OBJECTS OF THE INVENTION

It is an object of the present invention to overcome the drawbacks of the above-described techniques and to provide an entirely novel type of optically black surface for emitting and absorbing components, as well as a method for manufacturing said surface.

The goal of the invention is achieved by optically matching a lossy metallic surface over a desired wavelength range to its surrounding medium by means of a multilayer structure formed by a doped semiconductor material layer such as a silicon or germanium layer with a dielectric layer or layers. Thus, the metallic mirror surface is prevented from acting as a mirror over said desired wavelength range. Hence, the invention is also characterized in that a metallic mirror surface, which is optically matched to its surrounding medium over a desired wavelength range, is made to act as an optically black surface. Then, radiation imposed over said wavelength range on said metallic mirror is optically matched with said optically black surface and will be absorbed almost completely in the mirror material and the lossy material used as the matching layer. Reversely, the invention may also be utilized to emit radiation over a desired wavelength band. The invention is further characterized in that the location of the absorption band of said optically black surface can be shifted along the wavelength axis by altering the doping of said semiconductor layer.

In absorber use, the invention is different from prior-art components based on semiconductor techniques therein that, by virtue of the optical matching, the device according to the invention permits a major fraction of the radiation energy to be absorbed to reach the metallic mirror. This kind of optical matching can be accomplished already by using a single layer of optically functional thickness. By contrast, the above-described absorber disclosed by Liddiard is based on the use of a reversed antireflection coating, whereby the fraction of radiation passing through the semitransparent mirror layer is reflected back from the second metallic mirror layer and, by virtue of a phase shift in the lossy layer, at least partially cancels the radiation reflected from the semitransparent mirror layer. The absorber disclosed by Dobrzanski is optically different from Liddiard's absorber in that the semitransparent mirror forming the top layer in Liddiard's structure is replaced in Dobrzanski's absorber by an 0.1–1.5 µm thick, doped polycrystalline silicon layer. However, the principle of antireflection is the same as used by Liddiard, and also in this absorber the absorption is achieved in a different manner from that of the present invention by being chiefly concentrated in layers deposited above the metallic mirror layer of the device bottom surface.

More specifically, the structure according to the invention includes a metallic layer that is positioned on an upper surface of a support layer. A lossy layer is made from a doped semiconductor material. The thickness and doping of the lossy layer are proportioned to each other so that the structure formed by the metallic mirror layer with its overlying multilayer structure will be optically matched over the predetermined wavelength range of absorption or emission to the medium surrounding the structure.

The invention offers significant benefits. In the structure according to the invention, the location of the absorption band on the wavelength axis can be adjusted through varying both the thickness and doping of the semiconductor layer, thus making the optimization of the structure easier, whereby also mechanical and thermal requirements can be fulfilled in conjunction with the design of the optical properties. Hence, the invention offers an extremely good thermal insulation for the active detector area. The thermal mass of the detector area can be made small, which facilitates a high cutoff frequency of the modulation rate response of the detector. Furthermore, the response of the absorber structure according to the invention is stable with regard to ambient humidity, because the detector structure does not absorb moisture. The structure according to the invention tolerates a high operating temperature up to the order of 800° C., thus allowing its use in components of the optical emitter type, too.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
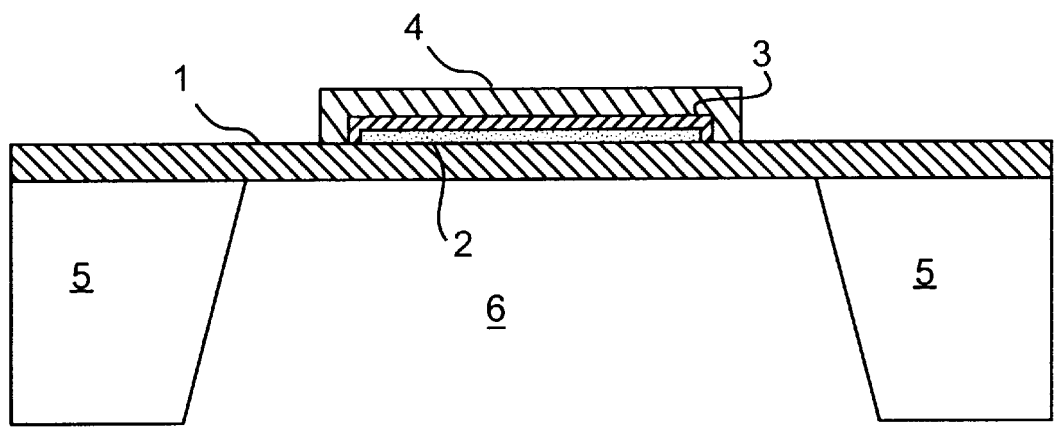
FIG. 1 shows a longitudinal section of an absorber with an optically black surface according to the invention operating over a given wavelength range.

As shown in FIG. 1, the absorber comprises a self-supporting dielectric layer 1 grown on a silicon substrate 5, a metallic mirror layer 2 deposited on said supporting dielectric layer 1, a protective layer 3 of dielectric material deposited on said metallic mirror layer 2 and a lossy layer 4 deposited thereon. The structure illustrated in FIG. 1 also includes an opening 6 etched into the substrate, said opening serving to reduce heat loss by conduction from said absorbing metallic mirror layer 2 to its surroundings. The structure shown in FIG. 2 differs from that of FIG. 1 only by having an additional protective layer 7 deposited on said lossy layer 4. Such a protective layer 7 is required on the lossy layer 4 if the component is to be operated at high temperatures. In practice, the protective layer 7 is necessary always if the component is to serve as an emitter in the optical wavelength range.

Besides those mentioned above, components being used as absorbers and emitters include additional elements, e.g., heater elements, resistive elements and/or thermal elements. The components may also be encapsulated in a vacuum, for instance, thus further improving the thermal isolation of the emitting/absorbing area of the component from its surroundings. The structural implementations of such components are, however, not elucidated in FIGS. 1 and 2, because the invention concerns a portion of these components and the optically black surface according to the invention may be applied to a variety of different components as well.

According to the invention, the metallic mirror layer 2 is matched to its surrounding medium by means of a lossy layer 4 over the wavelength range to be absorbed (or emitted, respectively). The lossy layer 4 is advantageously made from a material of high transmissivity over the desired wavelength range and in the immediate skirt areas thereof. Thus the absorber can be made selective with regard to the wavelengths to be absorbed (or emitted, respectively). To facilitate the optimization of the structure, not only for its optical properties, but also for its thermal, mechanical and production qualities, the lossy layer 4 is advantageously made from a material whose index of refraction may be easily varied during the production process of the component. Obviously, the layer material must also fulfill the requirements set for its mechanical and thermal performance and processability.

When the lossy layer 4 is advantageously made from a suitable semiconductor, the wavelength band of complete match can be adjusted by a suitable doping of the lossy layer 4. This approach is based on the fact that the index of refraction in lossy material is dependent on the plasma resonance parameters of the material that further are dependent on the concentration of free charge carriers in the material. This relationship can be expressed via the dependence of the effective permittivity on the dopant concentration as follows:

$$\varepsilon_{\mathit{eff}} = \varepsilon_\infty - \frac{e^2 n}{m^* \omega^2},$$

-continued where
- $\varepsilon_{eff}$ is effective permittivity,
- $\varepsilon_\infty$ is inherent permittivity of material,
- $n$ is concentration of free charge carriers,
- $m^*$ is effective mass of electron,
- $e$ is elementary charge and
- $\omega$ is angular frequency of radiation.

In absorbers operating over the 0.1–10 μm wavelength range, a particularly advantageous semiconductor material for the lossy layer 4 is polycrystalline silicon. Polycrystalline silicon is deposited readily on components using conventional silicon technology and its index of refraction can be altered by ion implantation and heat treatment, for instance.

Figure 3:
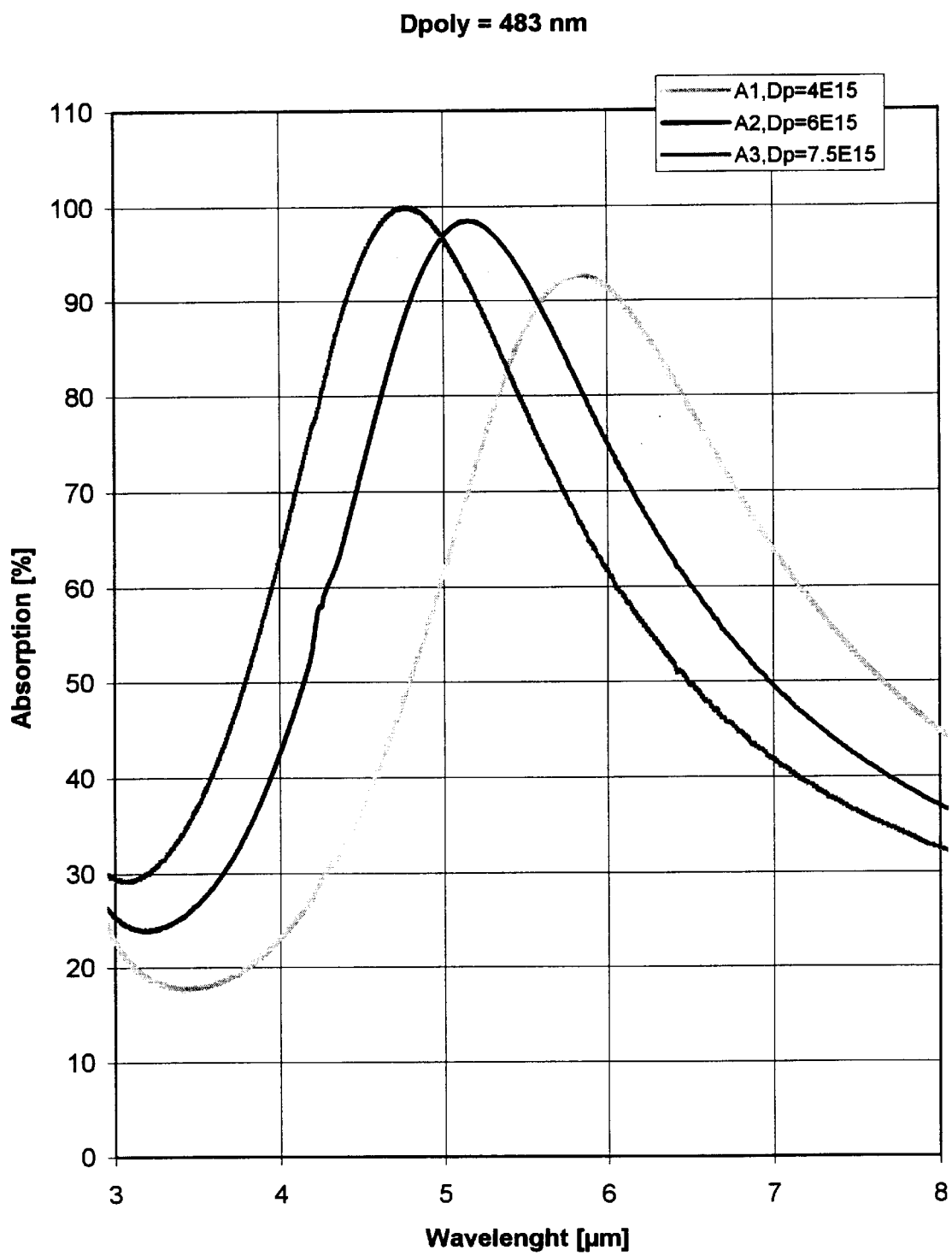
FIG. 3 shows absorption vs. wavelength plots for some optical surfaces according to the invention.
Figure 4:
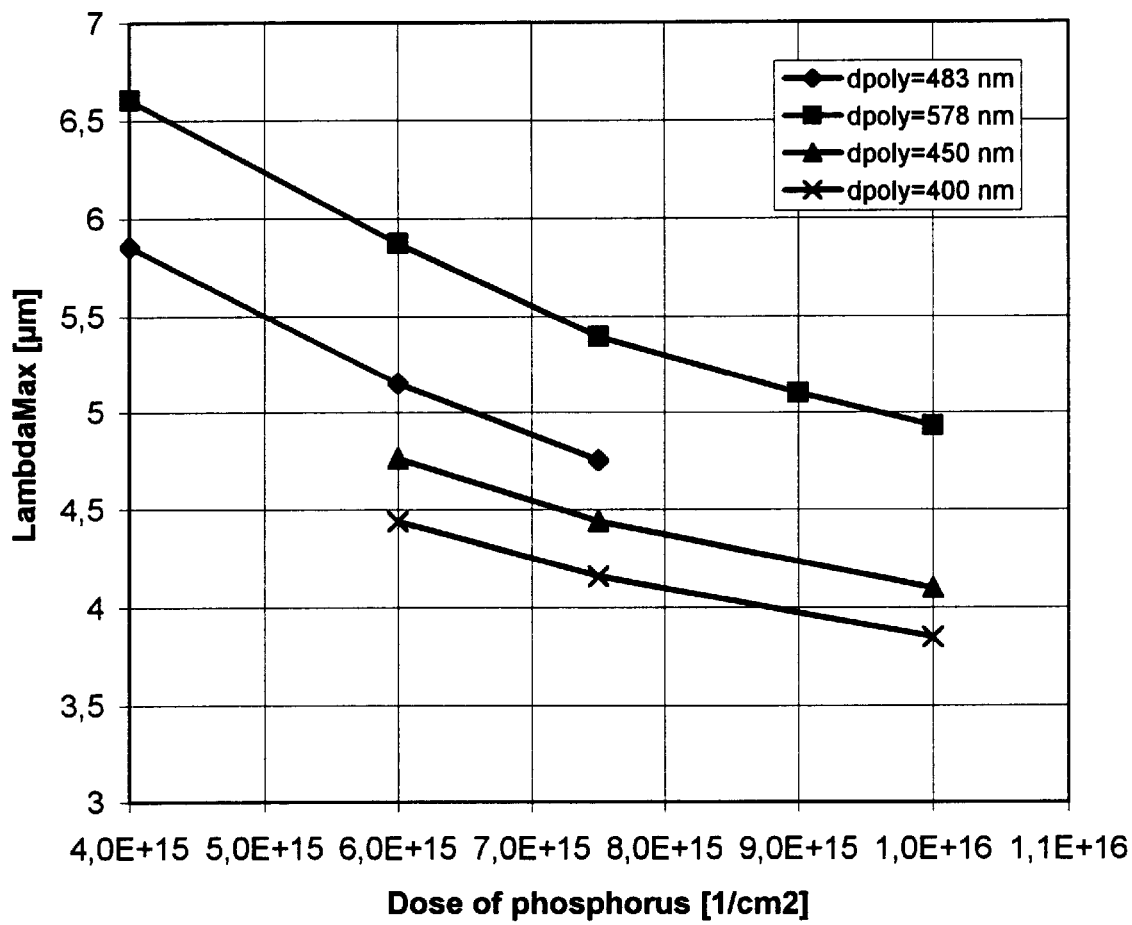
FIG. 4 shows plots of absorption maximum wavelength vs. dose of phosphorus ion implantation for some structures according to the invention.
Figure 5:
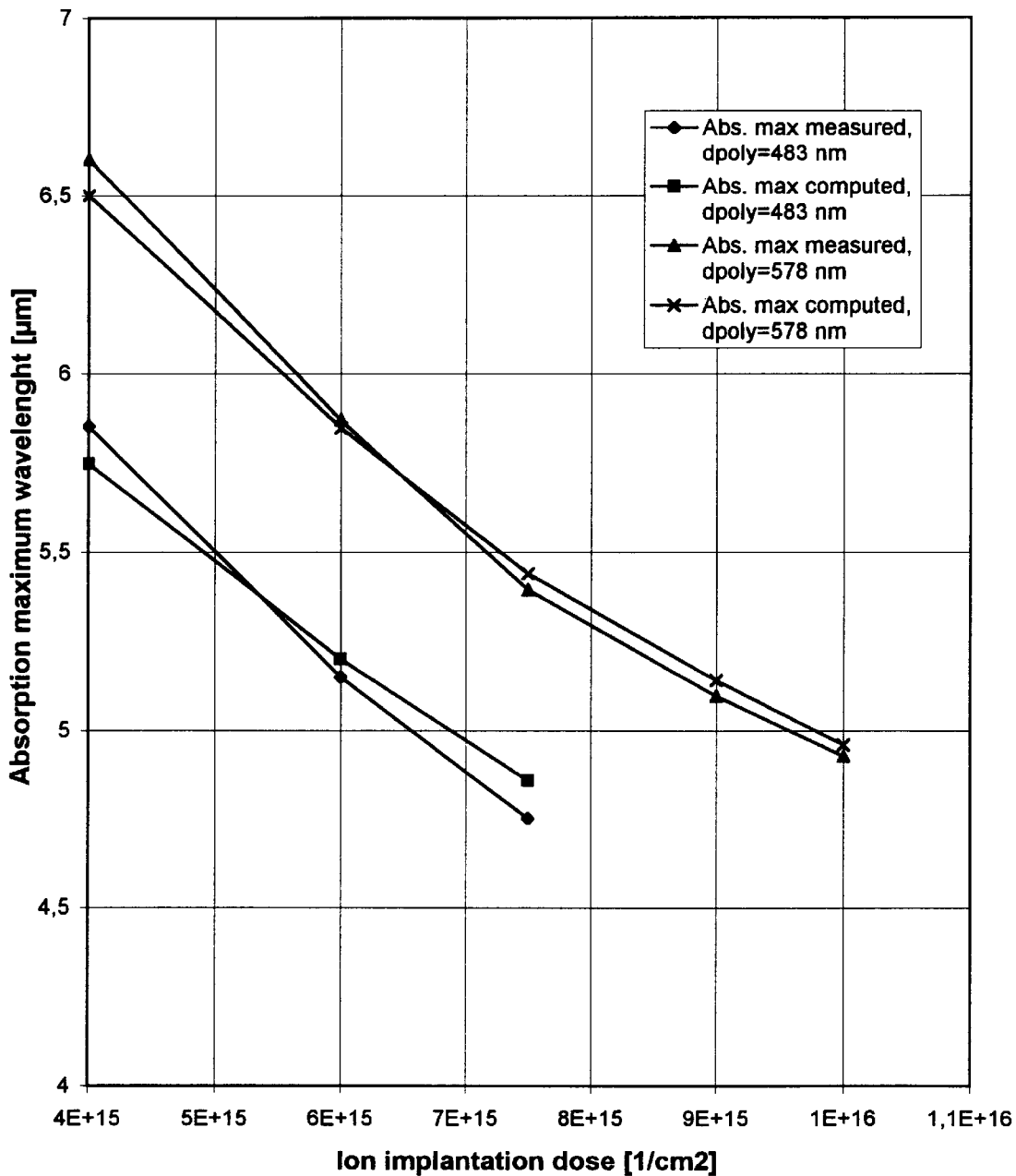
FIG. 5 shows plots of absorption maximum wavelength vs. dose of phosphorus ion implantation for some structures according to the invention with a comparison against theoretically computed values.

The effect of refractive index alterations on the absorption properties is illustrated in FIGS. 3, 4 and 5. In FIG. 3 is shown the shape and position of the absorption band plotted along the wavelength axis for different doses of phosphorus ion implantation (Dp,1/cm$^2$) in a structure having the lossy layer 4 made from a 483 nm thick layer of doped polycrystalline silicon. In FIG. 4 are shown experimental values measured for the wavelength of the absorption maximum as a function of phosphorus ion implantation doses in four structures of different thicknesses. Further in FIG. 5 is shown a plot of the wavelength of both the experimentally measured and computationally obtained absorption maxima as a function of dopant dose. The general theory of electromagnetic plane wave propagation in a layered structure is described in, e.g., the textbook Edward D. Palik, "Handbook of Optical Constants of Solids", Academic Press, Inc., 1985. The present invention draws upon this general theory. Also the computational curves in FIG. 5 are calculated on the basis of the theory described in section two of cited reference.

The physical thickness of said lossy layer 4 of polycrystalline silicon (or other suitable material) is determined by optimizing the layer within the constraints of available refractive index values for both its thermal and production parameters so that the optical thickness of the layer implements the optical matching in cooperation with the other layers over the desired wavelength range. In FIGS. 4 and 5 are plotted some possible parameter combinations that allow the invention to be implemented at certain wavelengths. The absorber structures shown in FIGS. 3–5 have the metallic mirror layer 2 made from molybdenum, the protective layer 3 of the mirror layer 1 from silicon nitride and the lossy layer 4 from phosphorus-doped polycrystalline silicon. In these absorber structures, the protective layer is about 50 nm thick and the metallic mirror layer 2 about 100 nm thick. The exemplifying absorber structures have no protective layer 7 made over the lossy layer 4.

From FIGS. 4 and 5 can be seen, among other things, that if the absorption maximum of the absorption band in the absorber structure is desired to coincide with about 4.5 μm wavelength, the thickness of the lossy layer 4 of polycrystalline silicon (marked as dpoly in the diagram) can be selected to be, e.g., 450 nm or 578 nm in the above-described structure. If the thickness of the layer 4 is 450 nm, the phosphorus implantation dose must be about 7.0×10$^{15}$ phosphorus ions per cm$^2$. For a 578 nm thick layer, the phosphorus implantation dose must be about 1.1×10$^{16}$ ions/cm$^2$, respectively, Obviously, the wavelength peak of the absorption maximum can be set to this exemplifying value also using other thicknesses of the lossy layer 4 provided that the implantation concentration is adjusted according to the thicknesses of the lossy layer 4 and the possibly used protective layers 3, 7. This dimensioning process can be carried out either based on the diagrams of FIGS. 4 and 5, or more generally, using computational techniques based on the general theory presented in cited reference. Typically, the thicknesses of the lossy layer 4 are selected to be in the range 0.1–1.5 μm.

If the lossy layer 4 is made from polycrystalline silicon, the material of the metallic mirror layer 2 is advantageously selected from the group of molybdenum, tantalum and tungsten. Molybdenum is a particularly advantageous mirror material, because its complex index of refraction can be matched almost ideally to the surrounding medium by means of doped silicon and dielectric layers. When molybdenum is used as the mirror material, the thickness of the metallic mirror layer 2 is advantageously 50–400 nm. The metallic layer is patterned by an etch or lift-off process into mirror areas 2 of a given size, whereby the metallic heat conductor path from between the detector area and the substrate 5 is removed.

The dielectric layer 1 is advantageously made from silicon nitride with a thickness of 100–200 nm. Alternatively, the dielectric layer 1 can be made from silicon dioxide, for instance. The protective layers 3, 7 of the metallic mirror layer 2 and the lossy layer 4 may also be made from a dielectric material, advantageously silicon nitride. Since the protective layers 3, 7 serve as support and protective elements, their contribution to the absorption properties of the entire structure should be minor. This can be assured by making the layers 3, 7 from silicon nitride. The protective layers 3, 7 may also function as electrical insulators. The protective layer 7 may have a thickness of 40–200 nm and the protective layer 3 may have a thickness of 20–200 nm, advantageously 20–100 nm.

Figure 2:
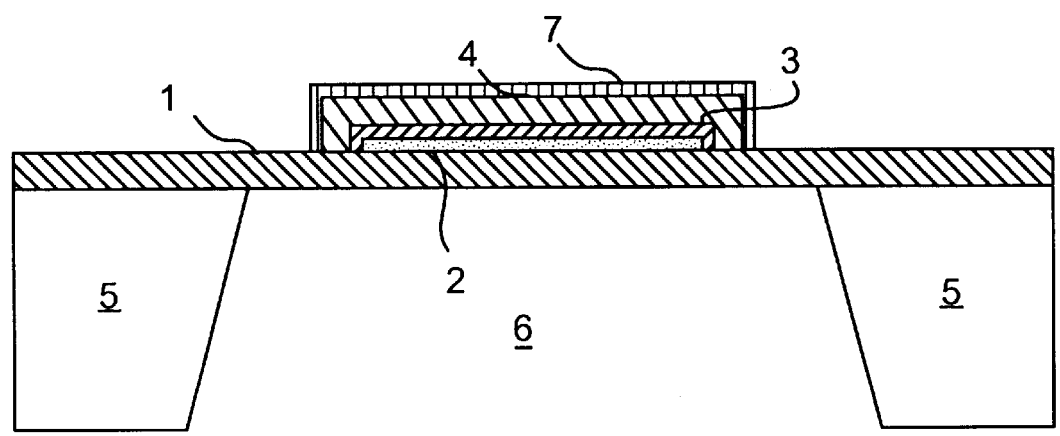
FIG. 2 shows a longitudinal section of an absorber-emitter with an optically black surface according to the invention operating over a given wavelength range.

The transmission of optical radiation through the detector areas of the component structures shown in FIGS. 1 and 2 is zero, because the metallic mirror layer 2 is nontransparent to light. Respectively, the emission of optical radiation takes place chiefly from the side of the metallic mirror layer 2 adjoining the lossy layer 4 inasmuch on the other side of the metallic layer the emitting surface is a metallic surface of extremely low emissivity. Resultingly, the structure shown in FIG. 2 having the lossy layer 4 covered by a protective layer 7 is also well suited for use as an emitter.

Alternative embodiments different from those described above may also be contemplated within the scope and spirit of the invention. The above description of the invention discloses the general principles of design for an optically black surface and the selection of production materials therefor. For instance, while not all possible material pairs capable of satisfying the rules of optical matching between the metallic mirror layer 2 and the lossy layer 4 have not necessarily been mentioned, other suitable material paired if there are any can be sought and found on the forementioned grounds by a person versed in the art. Respectively, it is not mandatory that the substrate 5 is made from silicon and the support layer 1 from silicon nitride. An absorber or emitter structure according to the invention can be complemented with different kinds of conductor and insulation structures depending on use of the structure in a bolometer, a thermopile or a thermal emitter. However, such additional structures are omitted from the diagrams of FIGS. 1 and 2 inasmuch their implementation falls outside the scope of the invention.

DETAILED DESCRIPTION OF THE PREFERRED EMBODIMENTS

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure manufactured using the fabrication techniques of micro-electronics so as to include an optically black surface adapted to function as an absorber or emitter, respectively, over a predetermined wavelength range, said structure comprising an electrically nonconducting support layer (1), a metallic mirror layer (2) made on said support layer (1), and a lossy layer (4) made on the support layer (1) and the metallic mirror layer (2) superimposed thereon, characterized in that the metallic mirror layer (2) is made on the upper surface of said support layer (1), the lossy layer (4) is made from a doped semiconductor material, and the thickness and doping of the lossy layer (4) are predetermined relative to each other so that the structure formed by the metallic mirror layer (2) with overlying layer structure comprised of said lossy layer will be optically matched over the predetermined wavelength range of absorption or emission, respectively, to a medium surrounding the structure.

2. A structure according to claim 1, characterized in that said lossy layer (4) comprises a layer of said semiconductor material, and a dopant dose applied into said semiconductor material so as to set the absorption/emission wavelength range of said optically black surface to its desired predetermined values.

3. A structure according to claim 1, characterized in that the semiconductor material of said lossy layer (4) is polycrystalline silicon or germanium.

4. A structure according to claim 1, characterized in that the mirror metal is molybdenumum, tantalum or tungsten.

5. A structure according to claim 1, characterized in that above said metallic mirror layer (2), and positioned between said metallic mirror layer (2) and said lossy layer (4), a first thin protective layer (3) is provided, and on the upper surface of said lossy layer (4), there is provided a second thin protective layer (7).

6. A structure according to claim 5, characterized in that the material of said first and said second thin protective layer (3, 7) and said support layer (1) is silicon dioxide, silicon nitride or a composite of silicon dioxide and silicon nitride.

* * * * *